Sept. 12, 1950 R. G. STEPHENSON 2,521,952

ELECTRONIC SWITCH

Filed June 13, 1945

RICHARD G. STEPHENSON. Inventor

By Ralph L. Chappell

Attorney

Patented Sept. 12, 1950

2,521,952

UNITED STATES PATENT OFFICE 2,521,952

ELECTRONIC SWITCH

Richard G. Stephenson, Santa Fe, N. Mex., assignor to the United States of America as represented by the Secretary of the Navy Application June 13, 1945, Serial No. 599,159

2 Claims. (Cl. 250—27)

Figures 1, 2:
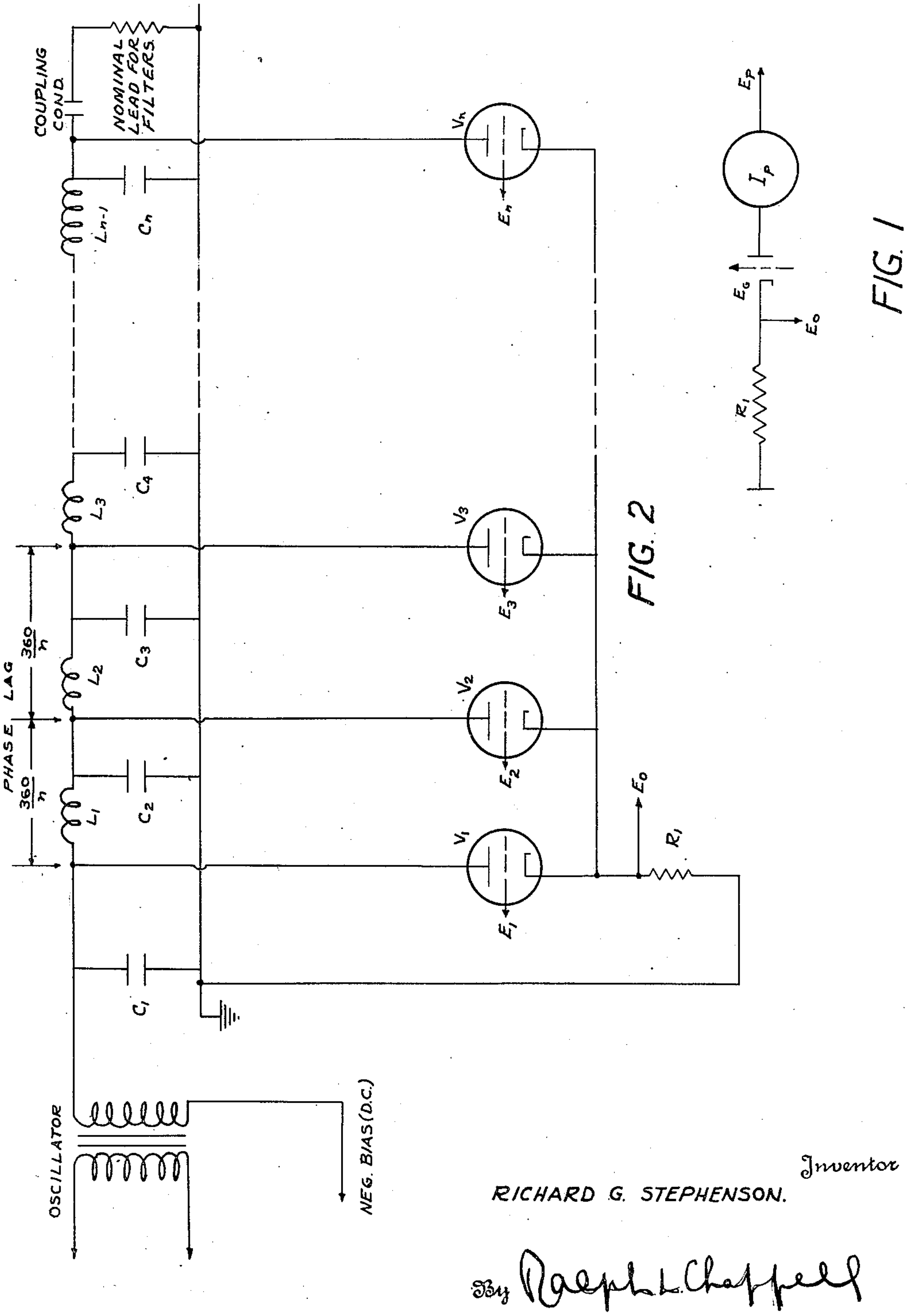

This invention relates to an electronic switch capable of transferring a plurality of input signals successively to a common output terminal such as a cathode ray screen.

An object of this invention is to provide an electronic switch capable of selecting in a chosen sequence, a plurality of signals and transferring them successively to a common terminal by a variation of the intensity of the grid voltage.

Other and incidental objects of the invention will be apparent to those skilled in the art from a reading of the following specification and an inspection of the accompanying drawings, in which Fig. 1 is a schematic view of a triode vacuum tube as used in this invention;

Fig. 2 is a contracted circuit diagram of this invention showing a plurality of tubes of Fig. 1 connected in the circuit.

Referring in more detail to Fig. 1 it is apparent the plate current $I_p$ is a function of the grid voltage $E_g$ and also the plate voltage. A resistor $R_1$ is inserted in the cathode circuit in order to properly present the output voltage $E_0$ characteristic.

In the frequency band passed thereby any filter connected as in Fig. 2 will have a phase shift which varies with the frequency. A low pass filter phase shift will vary from 0 at 0 frequency (D. C.) to 180° at the cut-off frequency. Thus, it is possible to obtain any phase shift up to 180° without appreciable attenuation. A series of such filters, identical in design, will then give successive phase shifts.

The voltages are lagged. $C_1$, $C_2$, $C_3$, etc., and $L_1$, $L_2$, $L_3$, etc., are components of such a line. In Fig. 2, $E_1$, $E_2$, $E_3$, etc., represent input voltages it is desired to switch. These voltages are applied to the grids of $V_1$, $V_2$, $V_3$, . . . $V_n$ triodes, respectively. The plates of these triodes are connected to condenser $C_1$, $C_2$ and $C_3$ of the lag line. Negative bias is applied to the lag line so that the net voltage applied to the plate of $V_1$, for example, is positive only for $1/n$ the total cycle, or $1/1000n$ for a 1000 cycle switching oscillator. For the switch oscillator, any standard oscillator will do, as no strenuous requirements of low harmonic constant or high frequency stability are placed thereon. If the lag line characteristics are so chosen that the first lag is $360°/n$ then only one plate will be positive at one time. Thus, only one tube will be conducting at a time and the current flowing through the cathode resistor $R_1$ will be succesively determined by $V_1$ grid alone, $V_2$ grid alone, $V_3$ grid alone, and so on up to $V_n$ grid alone. Only one signal will be affecting the output at any instant so the device will switch from one output to the next.

This switch will be satisfactory for input frequencies considerably higher or considerably lower than the switching frequency.

I claim:

1. An electronic signal channel selecting switch comprising an input transformer connection to a source of alternating current, the secondary voltage being of predetermined magnitude, a phase shifting network connected to said secondary comprising a number of equal fractional portions of the network total shift, a vacuum triode for each said portion of phase shift and having the anode thereof directly connected to said network, a common load element connected between the respective cathodes of said triodes and ground, a negative bias applied to said secondary and of magnitude sufficient to maintain said anodes at negative potential throughout each cycle of said secondary voltage except a fractional part thereof corresponding substantially to the number of said fractional portions per cycle, and a connection from the grids of said triodes to said signal channels, respectively, whereby each said signal channel is connected to apply voltage to said load element for substantially said fractional part of each cycle.

2. A signal switch for connecting separate signal channels successively to a common load comprising a biased transformer input, a segmented three hundred and sixty degree delay line connected to said input, the segments, respectively being constructed and arranged to delay the voltage wave impressed thereon by equal complementary fractions of each input voltage cycle, a vacuum triode for each said segment connected at the plate thereof to said line, means biasing the plate of each triode to cut-off except during one said fraction of each said cycle, means including a common load element connected to the cathodes, respectively, of the triodes for providing a common output therefrom, and means including the control grids of the triodes for impressing in successive order upon said load element the output of a number of signal channels equal to the number of segments in the delay line.

RICHARD G. STEPHENSON.

REFERENCES CITED

The following references are of record in the file of this patent:

UNITED STATES PATENTS

| Number | Name | Date |
|---|---|---|
| 2,172,354 | Blumlein | Sept. 12, 1939 |
| 2,199,634 | Koch | May 7, 1940 |